US007822833B2

(12) United States Patent
Tandon et al.

(10) Patent No.: US 7,822,833 B2
(45) Date of Patent: Oct. 26, 2010

(54) SYSTEM FOR CREATING AND VALIDATING CONFIGURATIONS OF OFFLINE FIELD DEVICES IN A PROCESS CONTROL SYSTEM

(75) Inventors: Vibhor Tandon, Karnataka (IN); Deepak Bhandiwad, Karnataka (IN); Gowtham Anne, Karnataka (IN); Karthikeya S. Ramanathan, Karnataka (IN)

(73) Assignee: Honeywell International Inc., Morristown, NJ (US)

( * ) Notice: Subject to any disclaimer, the term of this patent is extended or adjusted under 35 U.S.C. 154(b) by 261 days.

(21) Appl. No.: 12/112,215

(22) Filed: Apr. 30, 2008

(65) Prior Publication Data

US 2009/0276486 A1 Nov. 5, 2009

(51) Int. Cl.
*G06F 15/177* (2006.01)
(52) U.S. Cl. .................. 709/220; 709/221; 709/222
(58) Field of Classification Search .......... 700/18, 700/1, 83, 90; 707/104.1; 607/5; 702/64; 717/172, 105; 370/254; 710/19; 709/220, 709/221, 222
See application file for complete search history.

(56) References Cited

U.S. PATENT DOCUMENTS

| | | | |
|---|---|---|---|
| 6,141,596 A * | 10/2000 | Gretta et al. .................. 700/83 |
| 6,298,377 B1 | 10/2001 | Hartikainen et al. |
| 2002/0087308 A1 | 7/2002 | Ozawa |
| 2002/0104586 A1 | 8/2002 | Morikawa et al. |
| 2002/0120723 A1 | 8/2002 | Forth et al. |
| 2002/0161940 A1 | 10/2002 | Eryurek et al. |
| 2003/0135563 A1 | 7/2003 | Bodin et al. |
| 2004/0031030 A1 * | 2/2004 | Kidder et al. .................. 717/172 |
| 2004/0133598 A1 * | 7/2004 | Dobrowski et al. ......... 707/104.1 |
| 2004/0165544 A1 | 8/2004 | Cornett et al. |
| 2004/0167750 A1 | 8/2004 | Pagnano et al. |
| 2004/0193287 A1 * | 9/2004 | Lefebvre et al. ................ 700/1 |
| 2004/0259533 A1 | 12/2004 | Nixon et al. |
| 2005/0125173 A1 * | 6/2005 | Thalore et al. ................. 702/64 |
| 2006/0058847 A1 * | 3/2006 | Lenz et al. ...................... 607/5 |
| 2006/0206860 A1 * | 9/2006 | Dardinski et al. ........... 717/105 |
| 2006/0217822 A1 | 9/2006 | Ramanathan et al. |
| 2007/0100471 A1 * | 5/2007 | Kumar et al. .................. 700/18 |
| 2007/0250180 A1 * | 10/2007 | Bump et al. ..................... 700/1 |
| 2008/0046104 A1 * | 2/2008 | Van Camp et al. ............ 700/90 |
| 2008/0080395 A1 * | 4/2008 | Law et al. ..................... 370/254 |
| 2008/0228957 A1 * | 9/2008 | Meyer et al. .................. 710/19 |

FOREIGN PATENT DOCUMENTS

WO    WO 03/075206 A2    9/2003

* cited by examiner

*Primary Examiner*—Le Luu
(74) *Attorney, Agent, or Firm*—Munck Carter, LLP (57) ABSTRACT

A method includes receiving a first proposed value or attribute for a parameter associated with a field device. The field device is or will be used in a process control system. The method also includes determining whether the first proposed value or attribute is valid using a device description associated with the field device. The method further includes, if the first proposed value or attribute is not valid, receiving a second proposed value or attribute for the parameter associated with the field device and determining whether the second proposed value or attribute is valid. The determinations of whether the first and second proposed values or attributes are valid could occur when the field device is offline in the process control system. The method could further include receiving a configuration having multiple values or attributes for multiple parameters associated with the field device and validating at least some of those values or attributes.

21 Claims, 5 Drawing Sheets

SYSTEM FOR CREATING AND VALIDATING CONFIGURATIONS OF OFFLINE FIELD DEVICES IN A PROCESS CONTROL SYSTEM

TECHNICAL FIELD

This disclosure relates generally to process control systems and more specifically to an apparatus and method for creating configurations of offline field devices in a process control system.

BACKGROUND

Processing facilities are often managed using process control systems. Example processing facilities include manufacturing plants, chemical plants, crude oil refineries, and ore processing plants. Among other operations, process control systems typically manage the use of motors, valves, and other industrial equipment in the processing facilities.

Conventional process control systems routinely include a large number of field devices, such as sensors and actuators. Communications with field devices often occur using various standard or other protocols, such as HART, FOUNDATION Fieldbus, or PROFIBUS. These types of protocols often support the use of a structured language called the Electronic Device Description Language ("EDDL"), which is defined in the IEC 61804-3 standard. This language can be used to create device description or electronic device description ("DD/EDD") files, which describe the online functional behavior of the field devices. The DD/EDD files can be interpreted by a host application and used to control interactions with and configuration of the field devices.

SUMMARY

This disclosure provides an apparatus and method for creating configurations of offline field devices in a process control system.

In a first embodiment, a method includes receiving a first proposed value or attribute for a parameter associated with a field device. The field device is or will be used in a process control system. The method also includes determining whether the first proposed value or attribute is valid using a device description associated with the field device. The method further includes, if the first proposed value or attribute is not valid, receiving a second proposed value or attribute for the parameter associated with the field device and determining whether the second proposed value or attribute is valid.

In particular embodiments, determining whether the first proposed value or attribute is valid includes using a device description/electronic device description (DD/EDD) file associated with the field device.

In other particular embodiments, the parameter represents a dependent parameter, where the value or attribute of the dependent parameter depends on a value or attribute of a dominant parameter associated with the field device. Also, determining whether the first proposed value or attribute is valid includes determining whether the first proposed value or attribute is valid based on the value or attribute of the dominant parameter.

In yet other particular embodiments, the parameter represents a dominant parameter, where the value or attribute of the dominant parameter affects a value or attribute of at least one dependent parameter associated with the field device. Also, the method further includes identifying any dependent parameters affected by the value or attribute of the dominant parameter.

In still other particular embodiments, the determinations of whether the first and second proposed values or attributes are valid occur when the field device is offline in the process control system. The method also includes, when the field device is currently online in the process control system, receiving a configuration having multiple values or attributes for multiple parameters associated with the field device. The method further includes validating at least some of the multiple values or attributes in the configuration.

In other particular embodiments, validating at least some of the multiple values or attributes in the configuration includes identifying a value or attribute of a dominant parameter in the configuration. It also includes comparing the value or attribute of the dominant parameter in the configuration to an actual value or attribute of the dominant parameter from the field device. It further includes downloading a value or attribute of a dependent parameter in the configuration when the value or attribute of the dominant parameter in the configuration matches the actual value or attribute of the dominant parameter from the field device. In addition, it further includes validating the value or attribute of the dependent parameter in the configuration when the value or attribute of the dominant parameter in the configuration does not match the actual value or attribute of the dominant parameter from the field device. Interaction with a user could occur in order to assign a valid value or attribute to the dependent parameter.

In additional particular embodiments, validating at least some of the multiple values or attributes in the configuration includes attempting to download a value or attribute of a dominant parameter in the configuration to the field device in accordance with the device description. It also includes determining whether the download of the value or attribute of the dominant parameter is successful. It further includes downloading a value or attribute of a dependent parameter in the configuration when the download of the value or attribute of the dominant parameter is successful. In addition, it includes validating the value or attribute of the dependent parameter in the configuration using an actual value or attribute of the dominant parameter from the field device when the download of the value or attribute of the dominant parameter is not successful.

In a second embodiment, a system includes a client having a user interface, where the user interface is configured to receive a proposed value or attribute for a parameter associated with a field device from a user. The system also includes a server configured to receive the proposed value or attribute from the client and to validate the proposed value or attribute for the parameter. The server is capable of validating the proposed value or attribute even when the field device is not accessible to the server.

In a third embodiment, an apparatus includes an interface configured to receive a proposed value or attribute for a parameter associated with a field device. The apparatus also includes a processor configured to validate the proposed value or attribute for the parameter. The processor is capable of validating the proposed value or attribute even when the field device is not accessible.

In a fourth embodiment, a method includes receiving a configuration having multiple values or attributes for multiple parameters associated with a field device in a process control system. The method also includes validating at least some of the multiple values or attributes in the configuration.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 4B, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1:
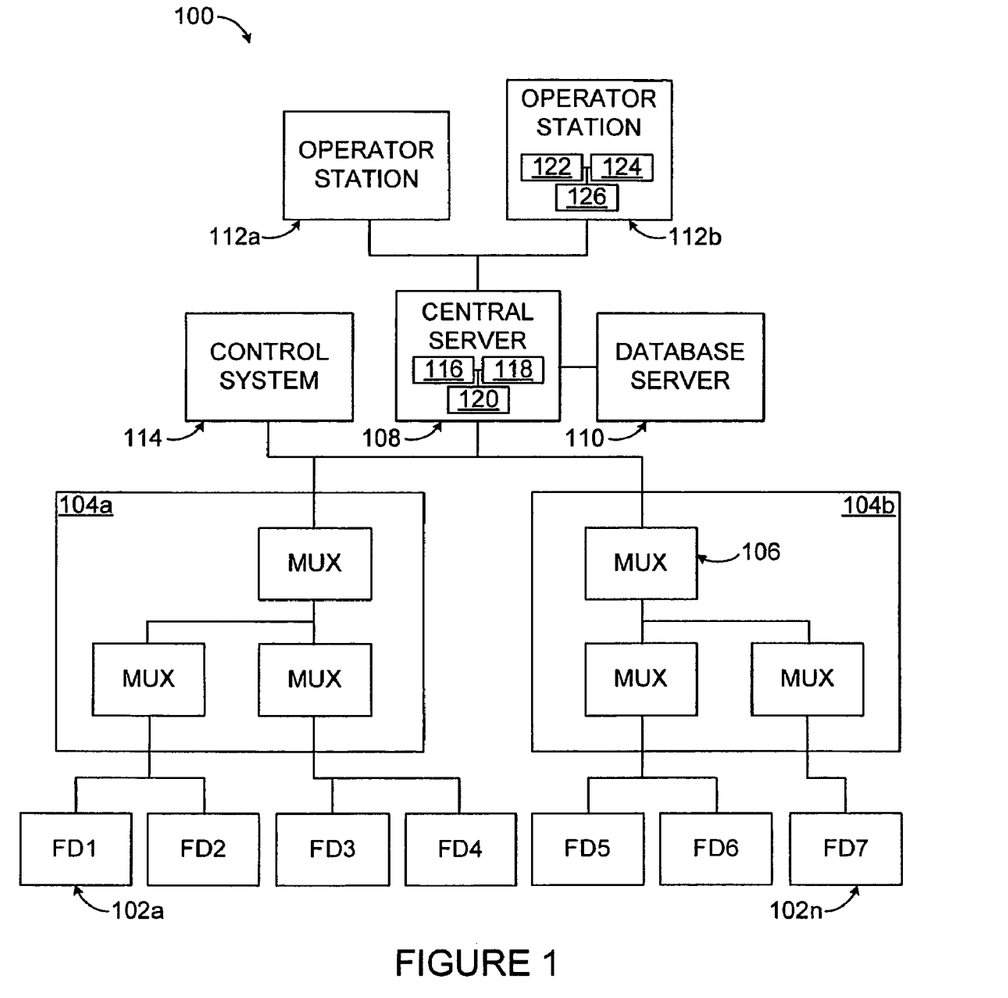
FIG. 1 illustrates an example process control system according to this disclosure.

FIG. 1 illustrates an example process control system 100 according to this disclosure. The embodiment of the process control system 100 shown in FIG. 1 is for illustration only. Other embodiments of the process control system 100 could be used without departing from the scope of this disclosure.

As shown in FIG. 1, the process control system 100 includes various field devices 102a-102n. The field devices 102a-102n represent devices that can perform a wide variety of functions in the process control system 100. The field devices 102a-102n are used to implement desired control strategies in the process control system 100. For example, the field devices 102a-102n could include sensors that measure a wide variety of characteristics in a process system, such as temperature, pressure, or flow rate. The field devices 102a-102n could also include actuators that alter a wide variety of characteristics in the process system, such as valves or heaters. The field devices 102a-102n could include any other or additional components in any suitable process system. Each of the field devices 102a-102n includes any suitable structure for performing one or more functions to implement at least one control strategy. Also, a process system may generally represent any system or portion thereof configured to process one or more products or other materials in some manner.

Each of the field devices 102a-102n is coupled to one of multiple control networks 104a-104b in this example. Each of the control networks 104a-104b generally transports control signals and other data to and from the field devices 102a-102n. Each of the control networks 104a-104b includes any suitable structure(s) facilitating interaction with one or more field devices. Also, each of the control networks 104a-104b could support any suitable protocol or protocols for communicating with one or more of the field devices 102a-102n. These protocols could include HART, FOUNDATION Fieldbus, PROFIBUS, or other protocol(s). In addition, each of the control networks 104a-104b could have any suitable network topology, and the field devices can be connected in any suitable manner to the control networks 104a-104b.

In this example, each of the control networks 104a-104b includes multiple multiplexers 106. The multiplexers 106 support communications with multiple field devices over shared communication links. For example, each of the multiplexers 106 can receive signals from multiple field devices (either directly or through other multiplexers) and multiplex the signals onto a single communication link. Each of the multiplexers 106 can also receive signals over the single communication link and de-multiplex the signals for forwarding to the field devices. The destination for specific signals transmitted through the multiplexers 106 may be determined in any suitable manner, such as based on destination addresses contained in the signals. Each of the multiplexers 106 includes any suitable structure for multiplexing and demultiplexing signals. It may be noted that the use of multiplexers 106 in the control networks 104a-104b is for illustration only. The control networks 104a-104b could include any suitable components in any suitable configuration, such as various controllers and inputs/outputs in a distributed control system (DCS).

A central server 108 is coupled to the control networks 104a-104b. The central server 108 transmits data to and receives data from the field devices 102a-102n over the control networks 104a-104b. For example, the central server 108 could send status requests to the field devices 102a-102n and receive corresponding status or diagnostic information from the field devices 102a-102n. The status information could identify a status of a field device, and the diagnostic information could identify any specific problems with the field device. The central server 108 could also send configuration requests for configuring the field devices 102a-102n over the control networks 104a-104b. Any other or additional information may be transmitted to or received from the field devices 102a-102n. The central server 108 includes any hardware, software, firmware, or combination thereof facilitating access or control over one or more field devices. In particular embodiments, the central server 108 represents a computing device executing a MICROSOFT WINDOWS operating system.

A database server 110 is coupled to the central server 108. The database server 110 stores various information used, generated, or collected by the central server 108. For example, the central server 108 could use a device description (such as a device description/electronic device description or "DD/EDD" file) to issue requests to a field device, and the device description could be stored in the database server 110. Also, the central server 108 could retrieve status or diagnostic information associated with a field device and store the data in the database server 110. The database server 110 could store any other or additional information. The database server 110 includes any suitable structure facilitating storage and retrieval of information.

One or more operator stations 112a-112b are coupled to the central server 108. The operator stations 112a-112b represent computing or communication devices providing user access to the central server 108. The operator stations 112a-112b facilitate various interactions with users. For example, the operator stations 112a-112b could allow users to view information about and configure field devices through user interfaces provided by the central server 108. The operator stations 112a-112b could also allow users to review data collected or generated by the central server 108, such as status and diagnostic information retrieved from the field devices. Each of the operator stations 112a-112b includes any hardware, software, firmware, or combination thereof for supporting user access and control of the system 100. In particular embodiments, the operator stations 112a-112b represent computing devices executing a MICROSOFT WINDOWS operating system.

A control system 114 is also coupled to the control networks 104a-104b. The control system 114 represents a device or collection of devices that can control the operation of the field devices 102a-102n. For example, the control system 114 could receive data from certain field devices (such as sensors) and generate control signals for adjusting other field devices (such as actuators). The control system 114 generally represents any suitable hardware, software, firmware, or combination thereof for controlling the operation of one or more field devices and communication links between the field devices and the control system.

In particular embodiments, the central server 108 could include one or more processors 116 and one or more memories 118 configured to store instructions and data used, generated, or collected by the processor(s). The central server 108 could also include one or more interfaces 120 for communicating with external networks, devices, or systems, such as an Ethernet, HART, FOUNDATION Fieldbus, PROFIBUS, MODBUS, DEVICE-NET, or CAN interface. Similarly, each of the operator stations 112a-112b could include one or more processors 122 and one or more memories 124 storing instructions and data used, collected, or generated by the processor(s). The operator stations 112a-112b could also include one or more interfaces 126 for communicating with external networks or systems, such as an Ethernet interface.

In one aspect of operation, the field devices 102a-102n can be configured in various ways, such as when various parameters in the field devices 102a-102n can be assigned various values or attributes. Since many of the parameters are interrelated (such as when one parameter's value directly affects the possible values of another parameter), conventional systems only allow online or active field devices to be configured. The field devices could receive the proposed parameter values or attributes and resolve any interdependencies with the parameters.

In accordance with this disclosure, device descriptions (such as EDDL DD/EDD files) can be used to enable the generation of configuration files or other sets of configuration data for field devices. This can be done even when a field device is offline, which includes all situations where communications with the field device cannot occur (such as when the field device is not physically connected to a control network, is not commissioned, is not powered, or is otherwise not accessible). Ordinarily, DD/EDD files are created to facilitate the configuration of field devices that are online. In other words, the DD/EDD files describe the online functional behavior of the field devices. However, field devices are often not available until they are commissioned in a process control system, so configuration files for the field devices cannot be created until the field devices are actually installed and operating in the process control system.

According to this disclosure, the device description for a field device can be used to generate a valid configuration for that field device, such as by ensuring that interdependent parameters have suitable values or attributes in the configuration. One or more configurations (such as different files) could therefore be generated without actually requiring access to a field device (or even before the field device is installed in the process control system 100). Once a valid configuration has been created, it can be downloaded to the field device (such as after the field device is installed in the process control system 100). If necessary, a second validation can occur for the configuration prior to download to the field device. This can be done to help ensure that the configuration contains a valid configuration for the now online field device. In this way, valid configurations can be generated for field devices without requiring direct contact with the field devices (which may or may not even be present in the process control system 100). Additional details regarding this functionality are provided below.

Although FIG. 1 illustrates one example of a process control system 100, various changes may be made to FIG. 1. For example, the process control system 100 could include any number of field devices, control networks, servers, operator stations, and control systems. Also, the makeup and arrangement of the control networks 104a-104b are for illustration only. The control networks 104a-104b may or may not include multiplexers, and the control networks 104a-104b could include any suitable components in any suitable configuration. In addition, FIG. 1 illustrates one operational environment in which the creation of configurations for field devices can be used. This functionality could be used with any suitable devices and in any suitable systems.

Figure 2:
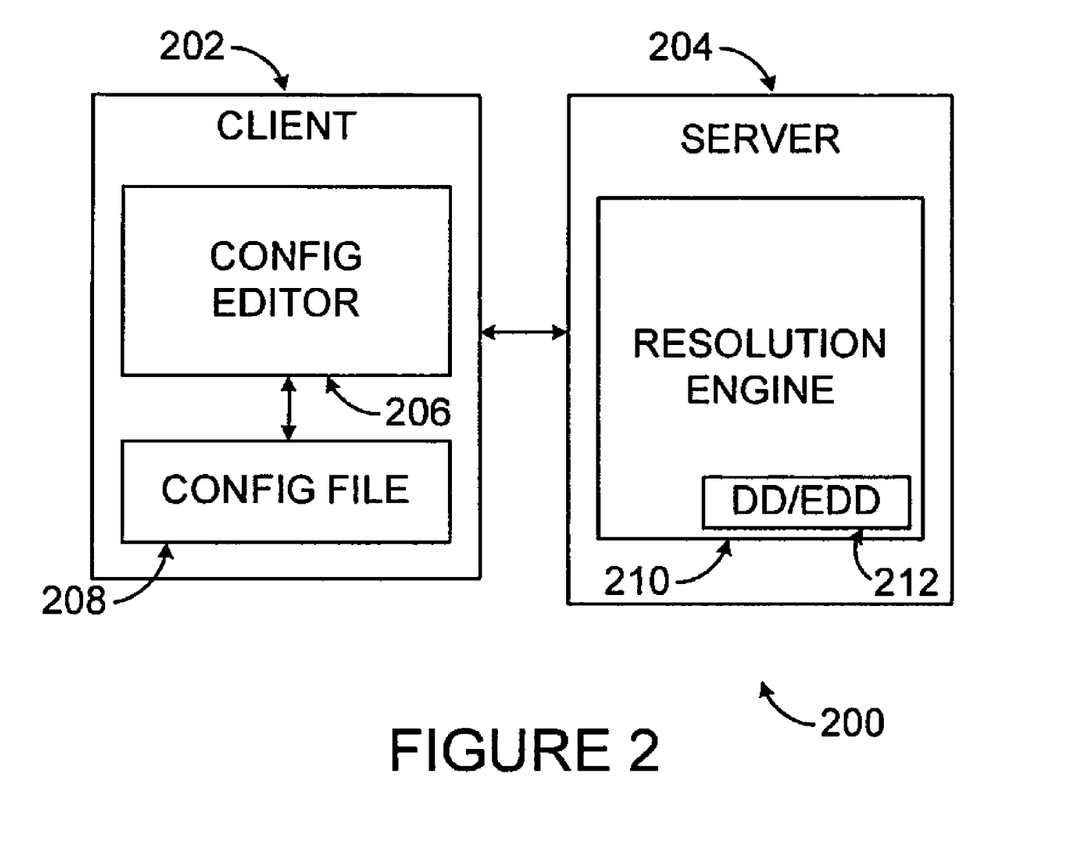
FIG. 2 illustrates an example mechanism for creating configurations of field devices in a process control system according to this disclosure.

FIG. 2 illustrates an example mechanism 200 for creating configurations of field devices in a process control system according to this disclosure. The embodiment of the mechanism 200 shown in FIG. 2 is for illustration only. Other embodiments of the mechanism 200 could be used without departing from the scope of this disclosure.

In this example, the mechanism 200 facilitates the creation and editing of configuration files for field devices using DD/EDD files. As noted above, EDDL allows DD/EDD files to be created that generally define the online functional behavior of field devices. These DD/EDD files can therefore be used to simulate the presence of a field device, which allows a valid configuration file to be generated without the field device being accessed or even online.

As shown in FIG. 2, the mechanism 200 includes two main components: a client 202 and a server 204. The client 202 could represent one of the operator stations 112a-112b in FIG. 1. The server 204 could represent the central server 108 in FIG. 1. In general, it may be noted that multiple ones of these components 202-204 could be implemented on a single physical component or on different physical components. Each of these components 202-204 could include any suitable hardware, software, firmware, or combination thereof for performing the functions described below.

The client 202 in this example includes or supports a configuration editor 206. The configuration editor 206 represents an application or other component that allows one or more sets of configuration information (such as configuration files 208) to be generated for one or more field devices. For example, the configuration editor 206 can interact with the server 204 and receive information identifying possible parameters that can be edited by a user for a field device. The configuration editor 206 could then provide any user-defined parameter values or attributes to the server 204 for validation, and results of the validation can be received from the server 204 and provided to the user. If necessary, the configuration editor 206 could then allow the user to alter the parameter values or attributes so that the parameter values or attributes are validated. The configuration editor 206 could further allow the user to save validated or non-validated configuration information as one or more configuration files 208.

The configuration editor 206 includes any hardware, software, firmware, or combination thereof for creating or modifying field device configurations. A configuration file 208 represents any suitable file, data structure, or other element having data defining one or more values or attributes for one or more parameters of a field device. A configuration file 208 could have any suitable format, such as an extensible Markup Language ("XML") file, a flat file, or a database record.

The server 204 in this example includes a resolution engine 210. The resolution engine 210 supports the validation of field device parameters. For example, the resolution engine 210 can load a device description (such as a DD/EDD file 212) for a field device or type of field device that is being configured offline. The DD/EDD file 212 typically contains a description of all of a field device's parameters, as well as valid values or ranges for parameter values or attributes and how parameter data can be accessed or altered.

Once loaded, the resolution engine 210 can examine or parse the DD/EDD file 212 and identify the parameters for a field device that can be edited by a user. The resolution engine 210 could provide a list of these parameters to the configuration editor 206, and the configuration editor 206 could present this list to the user. This list could be a flat list or it could include or incorporate various groupings (such as menus as defined in EDDL). In other words, the parameters may be identified in different forms to enhance the user's experience.

The configuration editor 206 could then receive proposed values or attributes for those parameters from the user. The configuration editor 206 provides those proposed values or attributes to the resolution engine 210, which can determine whether the proposed values or attributes are valid using the field device's device description. As a particular example, the resolution engine 210 could use the DD/EDD file 212 to resolve interdependencies between different field device parameters. Once the interdependencies are resolved, the resolution engine 210 can verify whether parameter values or attributes proposed by the user are valid.

The following represents a simplified example of the validation functionality that can be performed by the resolution engine 210. Suppose a field device has two parameters denoted "D" and "d." The valid values of parameter d could depend on the current value of parameter D. This means that parameter D is a dominant parameter (a parameter that affects a value or attribute of another parameter). This also means that parameter d is a dependent parameter (a parameter whose existence, value, or attribute depends on another parameter). In conventional systems, the client 202 would read the value of parameter D from an online field device, use it to identify the possible values of parameter d, and verify whether the desired value of parameter d is valid. Without an online field device, this resolution cannot occur in conventional systems. In accordance with this disclosure, the resolution engine 210 can use the DD/EDD file 212 for a field device and attempt to resolve parameter interdependencies, which can enable the resolution engine 210 to validate a proposed parameter value or attribute for a field device (such as an offline field device or an uncommissioned field device).

The resolution engine 210 could allow users to set or edit any suitable parameters during the validation process. For example, the resolution engine 210 could allow users to set or edit any dominant parameter's value or attribute (regardless of the dominant parameters' read/write handling). The resolution engine 210 could also allow users to edit any dependent parameters' values or attributes, as long as the dependent parameters have their read/write handling defined. The read/write handling identifies how values of parameters are read or written, and this handling could be dependent on other parameters.

The resolution engine 210 could also perform any suitable type(s) of verification(s) during the validation process. For example, when the resolution engine 210 first loads a DD/EDD file 212, the resolution engine 210 could present the user with a list of all parameters defined in the DD/EDD file. The user could then select one of the parameters and attempt to set or edit the value or attribute of the selected parameter.

If the user attempts to set or edit a dominant parameter's value or attribute, the resolution engine 210 could allow the user to set or edit that attribute. A check could be performed to verify whether the dominant parameter's proposed value or attribute is within an acceptable range defined in the DD/EDD file 212. Another check could be performed to verify whether any pre-edit, post-edit, or other procedural actions defined in the DD/EDD file 212 for the parameter are satisfied. The resolution engine 210 can also identify the dependent parameters that are affected by the dominant parameter's new value or attribute. The resolution engine 210 can then identify what those dependent parameters' values or attributes should be based on the dominant parameter's new value or attribute. Information about those dependent parameters can be presented to the user through the configuration editor 206, and the user could edit the dependent parameters' values or attributes.

If the user attempts to set or edit a dependent parameter's value or attribute, the resolution engine 210 can identify the dependent parameter's dominant parameter(s). The resolution engine 210 can then use the dominant parameter or parameters' value(s) to verify whether the dependent parameter should exist at all and, if so, what valid values or attributes can be used with the dependent parameter. The resolution engine 210 can use this information to determine if the value or attribute proposed by the user for the dependent parameter is valid.

In this way, the resolution engine 210 can interact with the user and verify in real-time whether proposed parameter values or attributes are valid for a given field device or field device type. If the user proposes an invalid parameter value or attribute, the resolution engine 210 can identify the invalid parameter value or attribute (using the DD/EDD file 212) and provide the user with an opportunity to correct it. After setting or editing various parameters (such as all dominant parameters and possibly various dependent parameters), the user could have a valid field device configuration that is ready for use. The user could store the parameter information as a configuration file 208.

The configuration file 208 could then be used in various ways. For example, the configuration file 208 could be opened again by the configuration editor 206 and edited again. The configuration file 208 could also be downloaded to a field device for implementation of the identified configuration. In addition, the configuration file 208 (which defines an offline configuration) could be compared to an online device configuration (a configuration generated when a field device is online). The configuration file 208 could be used in any other suitable manner.

The resolution engine 210 could perform a second validation when a configuration file 208 is to be downloaded to an online field device for actual use. For example, some parameters (such as certain dominant parameters) could represent read-only parameters for an online field device, which means the actual values or attributes for these dominant parameters could be unknown during offline configuration. A user could therefore make an educated guess about what the dominant parameter's value or attribute might be. The user may also assume that the dominant parameter's value or attribute is an expected or desired value. In any case, when creating the configuration file 208, the user could establish various dependent parameters' values or attributes in accordance with a dominant parameter's value or attribute that may or may not be correct when the field device goes online.

During the second validation, the values or attributes of the read-only dominant parameters from the configuration file 208 are compared against the actual values or attributes of the dominant parameters in the online field device. If no inconsistencies are identified, the dependent parameters' values or attributes can be downloaded from the configuration file 208 into the field device. In this case, the dependent parameters' values or attributes were previously validated by the resolution engine 210, and the dominant parameters' actual values or attributes that exist in the online field device are consistent with the values or attributes previously used to validate the dependent parameters.

If an inconsistency is identified, this could potentially cause a problem since the dependent parameters' values or attributes in the configuration file 208 were validated against inconsistent or incorrect read-only dominant parameters. To ensure a valid configuration is downloaded in this situation, the resolution engine 210 validates the dependent parameters' values or attributes in the configuration file 208 using the read-only dominant parameters' actual values or attributes from the online field device. The resolution engine 210 can also validate that the dependent parameters should exist at all given the read-only dominant parameters' actual values or attributes from the online field device. If any problems are detected, the user is notified through the configuration editor 206 and is allowed to edit the dependent parameters' values or attributes to make then consistent with the field device's actual dominant parameters.

Similarly, the resolution engine 210 can attempt to download writable dominant parameters' values or attributes to the online field device. If the download of a writable dominant parameter is successful, the resolution engine 210 can download any dependent parameters' values or attributes to the field device. If the download of a writable dominant parameter is not successful, the resolution engine 210 can validate any dependent parameters' values or attributes based on the dominant parameter's current value or attribute. The resolution engine 210 can also allow the user to modify the dependent parameters' values or attributes if necessary.

In this way, the resolution engine 210 can ensure that a valid field device configuration is being downloaded to a field device. The resolution engine 210 can verify whether dominant parameters' values or attributes used during the first validation process are consistent with actual values or attributes of the dominant parameters in an online field device. If so, the configuration file 208 validated during the first validation process is likely still valid. If not, the configuration file 208 validated during the first validation process might not still be valid, and the resolution engine 210 can validate the dependent parameters' values or attributes again.

The resolution engine 210 includes any hardware, software, firmware, or combination thereof for validating field device parameter values or attributes. The resolution engine 210 could, for example, represent a software application executed by the one or more processors 116 of the central server 108.

Although FIG. 2 illustrates one example of a mechanism 200 for creating configurations of field devices in a process control system, various changes may be made to FIG. 2. For example, any number of configuration editors, configurations, resolution engines, and device descriptions could be used.

Figure 3:
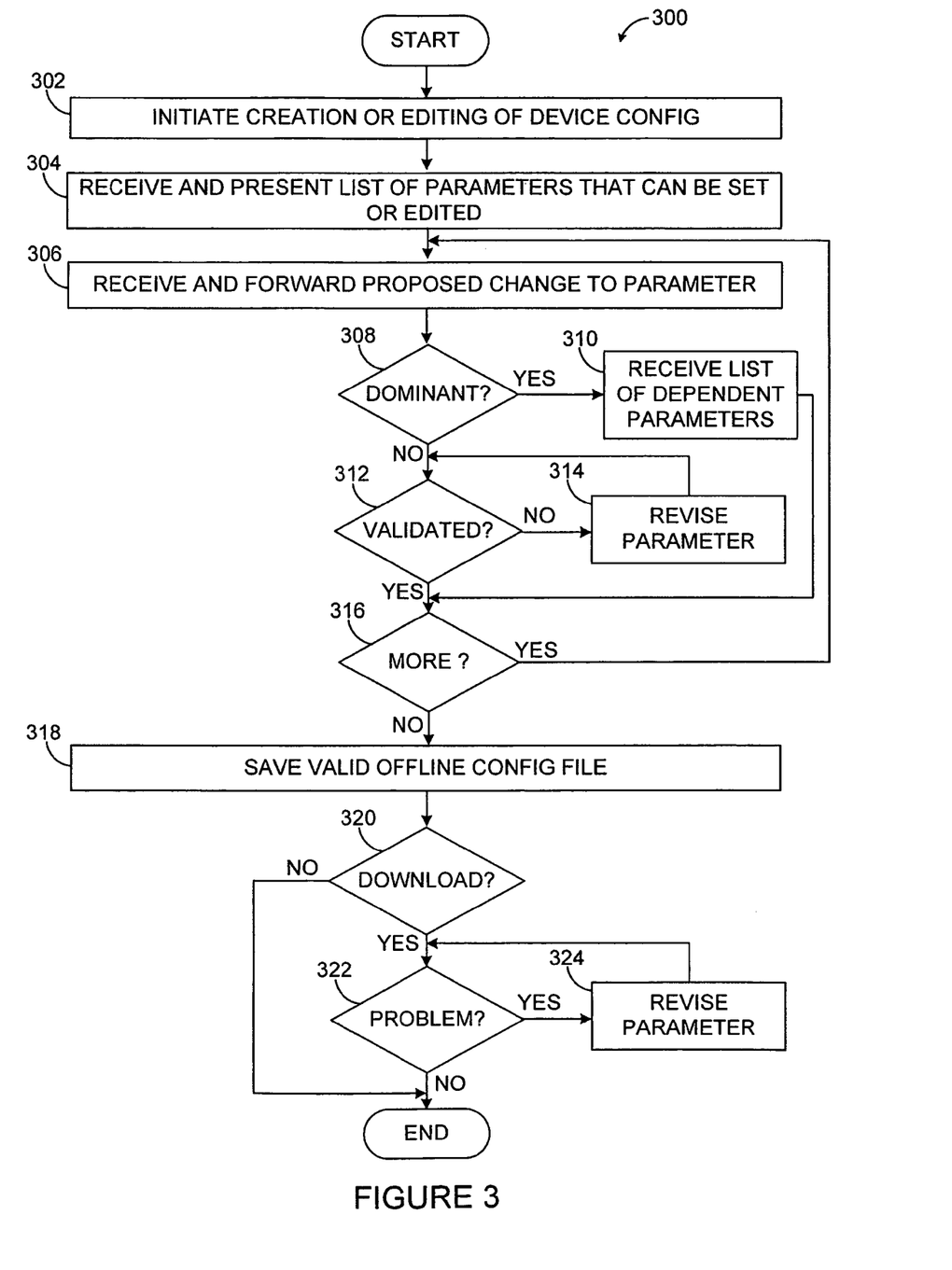
FIGS. 3 and 4A-4B illustrate example methods for creating configurations of field devices in a process control system according to this disclosure.
Figure 4A:
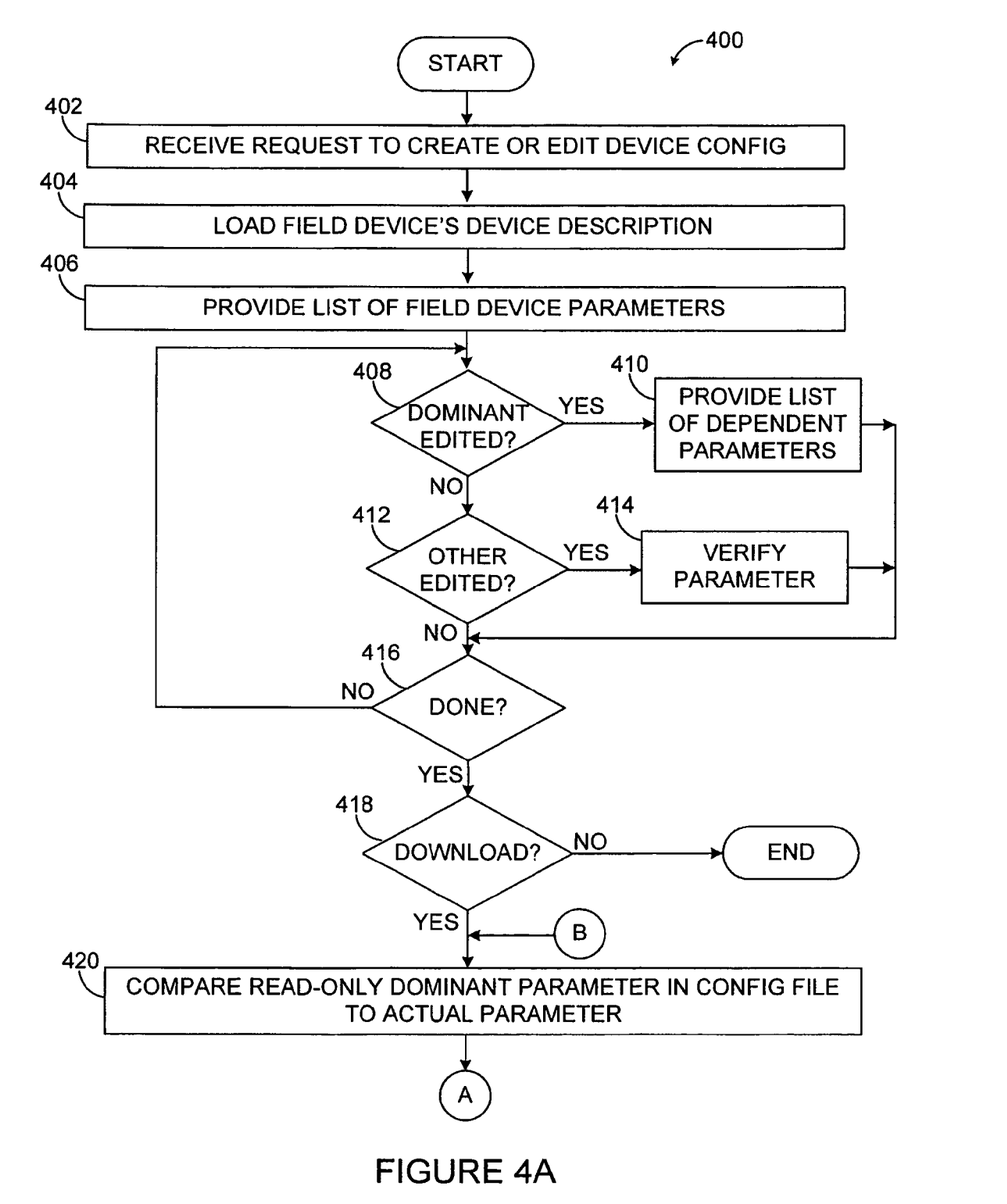
Figure 4B:
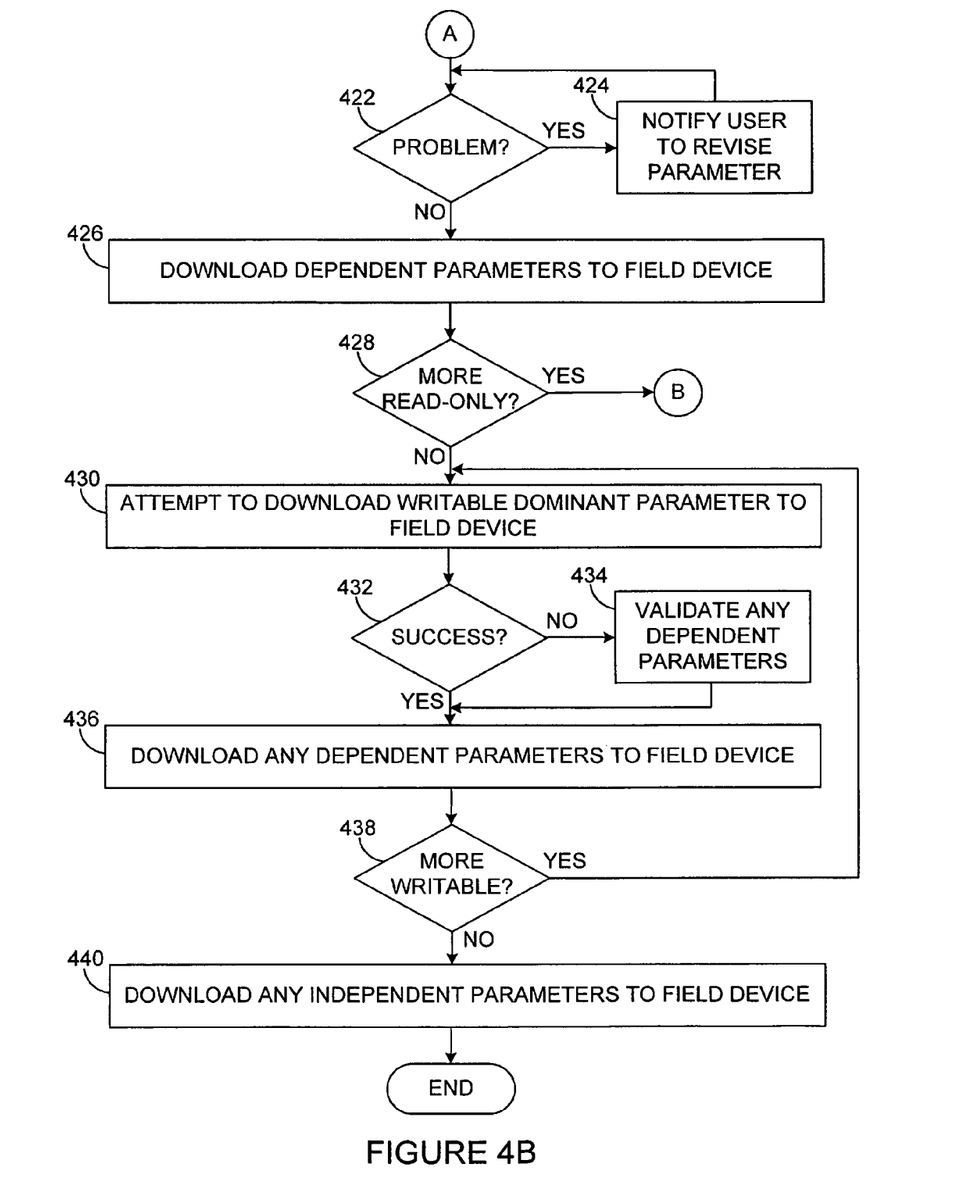

FIGS. 3 and 4A-4B illustrate example methods for creating configurations of field devices in a process control system according to this disclosure. The embodiments of the methods shown in FIGS. 3 and 4A-4B are for illustration only. Other embodiments of the methods could be used without departing from the scope of this disclosure.

As shown in FIG. 3, a method 300 includes initiating the creation or editing of a device configuration at step 302. This could include, for example, a user invoking the configuration editor 206 and attempting to create a new device configuration or edit an existing device configuration. During this step, the user could identify the specific field device or type of field device associated with a new device configuration. The specific field device or type of field device associated with an existing device configuration could be determined based on the contents of the existing device configuration (such as an existing configuration file 208).

A list of parameters that can be set or edited by the user is received and presented at step 304. This could include, for example, the configuration editor 206 receiving the list of parameters from the resolution engine 210. This could also include the configuration editor 206 providing a user interface that identifies the list of parameters. The list could be a flat list or support groupings.

A proposed change to at least one of the parameters is received and forwarded at step 306. This could include, for example, the configuration editor 206 receiving a proposed change to a parameter value or attribute through the user interface. The proposed change could affect a dominant or dependent parameter associated with the field device or field device type. This step could also include the configuration editor 206 forwarding the proposed change to the resolution engine 210.

If the proposed change is associated with a dominant parameter at step 308, a list of affected dependent parameters is received at step 310. This may include, for example, the configuration editor 206 receiving a list of dependent parameters that should exist and are affected by the dominant parameter's new value or attribute. This could also include the configuration editor 206 displaying the list of dependent parameters to the user. Again, the list could be a flat list or support groupings.

If the proposed change is not associated with a dominant parameter at step 308, the proposed change affects a dependent parameter or an independent parameter. An independent parameter generally represents a parameter that is neither a dominant nor dependent parameter (meaning its value or attribute is independent of all other parameters). A determination is therefore made whether the proposed change to the dependent or independent parameter is validated at step 312. This could include, for example, the configuration editor 206 receiving an indication from the resolution engine 210 whether a dependent parameter should exist and if the proposed change to the dependent parameter is valid. This could also include receiving an indication from the resolution engine 210 whether the proposed change to the independent parameter is valid. If the proposed change to the dependent or independent parameter is not validated, the user can revise the parameter at step 314. This could include, for example, the configuration editor 206 identifying a reason why the proposed change was not validated and receiving a new proposed change to the dependent or independent parameter's value or attribute from the user.

This process could continue as long as the user wishes to revise more parameters at step 316. This could include, for example, the user selecting another parameter for setting or editing or the user choosing to save a configuration file. If more parameters are to be set or edited, the method 300 returns to step 306 to allow the user to make additional changes to parameters. Otherwise, a valid offline configuration file is saved at step 318. This could include, for example, the configuration editor 206 saving the validated parameter values or attributes in a configuration file 208.

At this point, the configuration file could be used in any suitable manner. If that use involves downloading the configuration file to an online field device at step 320, a determination is made whether any problems exist with the configuration file at step 322. This could include, for example, the configuration editor 206 providing the configuration file 208 to the resolution engine 210 for a second verification. If a problem with the configuration file being downloaded is detected and reported by the resolution engine, the user is given an opportunity to revise parameters at step 324. This could include, for example, the configuration editor 206 identifying a reason why a dependent parameter could not be validated and receiving a proposed change to the dependent parameter's value or attribute from the user.

In this way, a configuration file 208 can be generated that contains a valid configuration for a field device according to the field device's device description. The configuration file 208 can then be validated again to make sure that the configuration defined in the configuration file 208 remains valid after the field device becomes active.

As shown in FIGS. 4A-4B, a method 400 includes receiving a request to create or edit a device configuration at step 402. This could include, for example, the configuration editor 206 providing a request to the resolution engine 210. The request could identify the field device or type of field device associated with the configuration being created or edited.

A field device DD/EDD file is loaded at step 404. This could include, for example, the resolution engine 210 retrieving the appropriate DD/EDD file 212 from the database server 110. A list of parameters associated with the field device or field device type is provided at step 406. This could include, for example, the resolution engine 210 parsing the DD/EDD file 212 to identify all of the parameters associated with the field device or field device type to be configured. This could also include the resolution engine 210 providing the list of parameters to the configuration editor 206 for presentation to a user. The list could be a flat list or support groupings.

At this point, the user can attempt to set or edit one or more of the field device parameters. If the user attempts to edit a dominant parameter and provides a valid value or attribute at step 408, a list of dependent parameters that should exist and that are affected by the dominant parameter is generated at step 410. This could include, for example, the resolution engine 210 receiving a proposed change to the dominant parameter's value or attribute from the configuration editor 206. This could also include the resolution engine 210 determining whether the proposed change to the dominant parameter is valid (such as by verifying whether the dominant parameter's proposed value is within a specified range and whether any pre-edit, post-edit, or other procedural actions for the parameter are satisfied). If not, the user can be notified and allowed to submit a valid value or attribute for the dominant parameter. This may further include the resolution engine 210 determining which dependent parameters should exist and could be affected by the dominant parameter's value or attribute. In addition, this could include the resolution engine 210 providing the list of dependent parameters to the configuration editor 206. The list could be a flat list or support groupings.

If the user attempts to set or edit a dependent parameter or independent parameter at step 412, a proposed change to the parameter is validated at step 414. This could include, for example, the resolution engine 210 receiving the proposed change to the dependent or independent parameter's value or attribute from the configuration editor 206. For a dependent parameter, this may also include the resolution engine 210 determining which dominant parameter or parameters affect the dependent parameter and whether the dependent parameter's proposed value or attribute is valid in light of the identified dominant parameter(s). For an independent parameter, this may also include the resolution engine 210 determining whether the independent parameter's proposed value or attribute is valid based on the device description. This could further include the resolution engine 210 providing an indication whether the proposed change to the dependent or independent parameter's value or attribute is valid. In addition, this could include the resolution engine 210 determining whether the dependent or independent parameter's proposed value is within a specified range and whether any pre-edit, post-edit, or other procedural actions for the parameter are satisfied. If the dependent or independent parameter is not validated, this step could further include interacting with the user until the user makes a valid assignment to the parameter.

A determination is made whether any additional parameters are to be validated at step 416. If not, the validated parameters could be stored in a configuration file 208 by the configuration editor 206. If an attempt is made to download the configuration file to an online field device at step 418, a read-only dominant parameter in the configuration file is compared to an actual dominant parameter of the online field device at step 420. This could include, for example, the configuration editor 206 providing the configuration file 208 to the resolution engine 210 for verification and downloading. This may also include the resolution engine 210 verifying whether a read-only dominant parameter's value or attribute in the configuration file 208 matches the dominant parameter's existing value or attribute actually in the online field device. If the parameters match, no problem is identified at step 422, and downloading of the read-only dominant parameter's dependent parameters occurs at step 426.

Otherwise, the read-only dominant parameter's value or attribute in the configuration file 208 does not match the dominant parameter's existing value or attribute actually in the online field device. The resolution engine 210 can perform a second validation during step 422 to determine whether the dominant parameter's dependent parameters in the configuration file have valid values or attributes in light of the dominant parameter's existing value or attribute in the online field device. If any of the dependent parameters cannot be validated, the user is given the opportunity to revise the parameters at step 424. As a result, a configuration file 208 that initially appears to be valid (according to the DD/EDD file 212) can be validated again in light of an online field device's actual parameters. If additional read-only parameters remain to be validated at step 428, the method 400 returns to step 420.

A download of a writable dominant parameter to the field device is attempted at step 430. This could include, for example, the resolution engine 210 attempting to write the value or attribute of the writable dominant parameter to the field device. If the write was successful at step 432, the dependent parameters of the writable dominant parameter are downloaded to the field device at step 436. In this case, the dependent parameters need not be validated again since the writable dominant parameter's value or attribute from the configuration file 208 was successfully written to the field device.

Otherwise, the writable dominant parameter's value or attribute in the configuration file 208 was not downloaded successfully to the field device. At this point, the actual value or attribute of the writable dominant parameter in the field device is used to validate the dominant parameter's dependent parameters at step 434. If necessary, the user is given the opportunity to revise the dependent parameters during this step. Once validated, the dependent parameters are downloaded to the field device at step 436. If additional writable parameters remain to be downloaded at step 438, the method 400 returns to step 430.

Any independent parameters are written to the field device at step 440. An independent parameter is written to the field device in accordance with the device description for the field device. However, since the independent parameter's value or attribute was verified previously during the creation of the configuration, the independent parameter's value or attribute need not be verified again here.

In this way, the resolution engine 210 can be used to facilitate the generation of a field device configuration according to the field device's device description. The resolution engine 210 can also validate the configuration prior to downloading the configuration to the field device. This can be done to make sure that the configuration remains valid after the field device becomes active.

Although FIGS. 3 and 4A-4B illustrate examples of methods for creating configurations of field devices in a process control system, various changes may be made to FIGS. 3 and 4A-4B. For example, while shown as a series of steps, various steps in each figure could overlap, occur in parallel, or occur multiple times.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory ("ROM"), random access memory ("RAM"), a hard disk drive, a compact disc ("CD"), a digital video disc ("DVD"), or any other type of memory.

It may be advantageous to set forth definitions of certain words and phrases used throughout this patent document. The term "couple" and its derivatives refer to any direct or indirect communication between two or more elements, whether or not those elements are in physical contact with one another. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system, or part thereof that controls at least one operation. A controller may be implemented in hardware, firmware, software, or some combination of at least two of the same. The functionality associated with any particular controller may be centralized or distributed, whether locally or remotely.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
   receiving a first proposed value or attribute for a parameter associated with a field device, wherein the field device is or will be used in a process control system;
   determining, at a processing device, whether the first proposed value or attribute is valid using a device description associated with the field device;
   if the first proposed value or attribute is not valid, receiving a second proposed value or attribute for the parameter associated with the field device and determining whether the second proposed value or attribute is valid, wherein the determinations of whether the first and second proposed values or attributes are valid are capable of occurring without access to the field device;
   receiving a configuration comprising multiple values or attributes for multiple parameters associated with the field device; and
   validating at least some of the multiple values or attributes in the configuration with access to the field device.

2. The method of claim 1, wherein determining whether the first proposed value or attribute is valid comprises using a device description/electronic device description (DD/EDD) file associated with the field device.

3. The method of claim 1, wherein:
   the parameter comprises a dependent parameter, the value or attribute of the dependent parameter depending on a value or attribute of a dominant parameter associated with the field device; and
   determining whether the first proposed value or attribute is valid comprises determining whether the first proposed value or attribute is valid based on the value or attribute of the dominant parameter.

4. The method of claim 1, wherein:
   the parameter comprises a dominant parameter, the value or attribute of the dominant parameter affecting a value or attribute of at least one dependent parameter associated with the field device; and
   further comprising identifying any dependent parameters affected by the value or attribute of the dominant parameter.

5. The method of claim 1, wherein validating at least some of the multiple values or attributes in the configuration comprises:
   identifying a value or attribute of a dominant parameter in the configuration;
   comparing the value or attribute of the dominant parameter in the configuration to an actual value or attribute of the dominant parameter from the field device;
   downloading a value or attribute of a dependent parameter in the configuration when the value or attribute of the dominant parameter in the configuration matches the actual value or attribute of the dominant parameter from the field device; and
   validating the value or attribute of the dependent parameter in the configuration when the value or attribute of the dominant parameter in the configuration does not match the actual value or attribute of the dominant parameter from the field device.

6. The method of claim 5, further comprising:
   interacting with a user to assign a valid value or attribute to the dependent parameter.

7. The method of claim 1, wherein validating at least some of the multiple values or attributes in the configuration comprises:
   attempting to download a value or attribute of a dominant parameter in the configuration to the field device in accordance with the device description;
   determining whether the download of the value or attribute of the dominant parameter is successful;
   downloading a value or attribute of a dependent parameter in the configuration when the download of the value or attribute of the dominant parameter is successful; and
   validating the value or attribute of the dependent parameter in the configuration using an actual value or attribute of the dominant parameter from the field device when the download of the value or attribute of the dominant parameter is not successful.

8. The method of claim 1, wherein validating at least some of the multiple values or attributes in the configuration comprises:
identifying a value or attribute of an independent parameter in the configuration, the value or attribute of the independent parameter not depending on a value or attribute of any other parameter associated with the field device; and
downloading the value or attribute of the independent parameter in accordance with the device description.

9. A system comprising:
a client comprising a user interface, the user interface configured to receive a proposed value or attribute for a parameter associated with a field device from a user, wherein the client comprises a processing device; and
a server configured to:
receive the proposed value or attribute from the client and to validate the proposed value or attribute for the parameter, wherein the server is capable of validating the proposed value or attribute even when the field device is not accessible to the server
receive a configuration comprising multiple values or attributes for multiple parameters associated with the field device, and
validate at least some of the multiple values or attributes in the configuration with access to the field device.

10. The system of claim 9, wherein:
the server further comprises a memory configured to store a device description associated with the field device; and
the server is configured to validate the proposed value or attribute for the parameter using the device description.

11. The system of claim 9, wherein:
the parameter comprises a dependent parameter, the value or attribute of the dependent parameter depending on a value or attribute of a dominant parameter associated with the field device; and
the server is configured to validate the proposed value or attribute based on the value or attribute of the dominant parameter.

12. The system of claim 9, wherein:
the parameter comprises a dominant parameter, the value or attribute of the dominant parameter affecting a value or attribute of at least one dependent parameter associated with the field device; and
the server is further configured to identify any dependent parameters affected by the value or attribute of the dominant parameter and to provide information identifying the dependent parameters affected by the value or attribute of the dominant parameter to the client.

13. The system of claim 9, wherein the server is configured to validate at least some of the multiple values or attributes in the configuration by:
identifying a value or attribute of a dominant parameter in the configuration;
comparing the value or attribute of the dominant parameter in the configuration to an actual value or attribute of the dominant parameter from the field device;
downloading a value or attribute of a dependent parameter in the configuration when the value or attribute of the dominant parameter in the configuration matches the actual value or attribute of the dominant parameter from the field device; and
validating the value or attribute of the dependent parameter in the configuration when the value or attribute of the dominant parameter in the configuration does not match the actual value or attribute of the dominant parameter from the field device.

14. The system of claim 9, wherein the server is configured to validate at least some of the multiple values or attributes in the configuration by:
attempting to download a value or attribute of a dominant parameter in the configuration to the field device in accordance with the device description;
determining whether the download of the value or attribute of the dominant parameter is successful;
downloading a value or attribute of a dependent parameter in the configuration when the download of the value or attribute of the dominant parameter is successful; and
validating the value or attribute of the dependent parameter in the configuration using an actual value or attribute of the dominant parameter from the field device when the download of the value or attribute of the dominant parameter is not successful.

15. An apparatus comprising:
an interface configured to receive a proposed value or attribute for a parameter associated with a field device; and
a processor configured to:
validate the proposed value or attribute for the parameter, wherein the processor is capable of validating the proposed value or attribute even when the field device is not accessible;
receive a configuration comprising multiple values or attributes for multiple parameters associated with the field device; and
validate at least some of the multiple values or attributes in the configuration with access to the field device.

16. The apparatus of claim 15, wherein the processor is configured to validate at least some of the multiple values or attributes in the configuration by:
identifying a value or attribute of a dominant parameter in the configuration;
comparing the value or attribute of the dominant parameter in the configuration to an actual value or attribute of the dominant parameter from the field device;
downloading a value or attribute of a dependent parameter in the configuration when the value or attribute of the dominant parameter in the configuration matches the actual value or attribute of the dominant parameter from the field device; and
validating the value or attribute of the dependent parameter in the configuration when the value or attribute of the dominant parameter in the configuration does not match the actual value or attribute of the dominant parameter from the field device.

17. The apparatus of claim 15, wherein the processor is configured to validate at least some of the multiple values or attributes in the configuration by:
attempting to download a value or attribute of a dominant parameter in the configuration to the field device in accordance with the device description;
determining whether the download of the value or attribute of the dominant parameter is successful;
downloading a value or attribute of a dependent parameter in the configuration when the download of the value or attribute of the dominant parameter is successful; and
validating the value or attribute of the dependent parameter in the configuration using an actual value or attribute of the dominant parameter from the field device when the download of the value or attribute of the dominant parameter is not successful.

18. A method comprising:
receiving a configuration comprising multiple values or attributes for multiple parameters associated with a field device in a process control system, wherein the configuration is created through a validation process without access to the field device; and
validating, at a processing device, at least some of the multiple values or attributes in the configuration with access to the field device.

19. The method of claim 18, wherein validating at least some of the multiple values or attributes in the configuration comprises:
identifying a value or attribute of a dominant parameter in the configuration;
comparing the value or attribute of the dominant parameter in the configuration to an actual value or attribute of the dominant parameter from the field device;
downloading a value or attribute of a dependent parameter in the configuration when the value or attribute of the dominant parameter in the configuration matches the actual value or attribute of the dominant parameter from the field device; and
validating the value or attribute of the dependent parameter in the configuration when the value or attribute of the dominant parameter in the configuration does not match the actual value or attribute of the dominant parameter from the field device.

20. The method of claim 18, wherein validating at least some of the multiple values or attributes in the configuration comprises:
attempting to download a value or attribute of a dominant parameter in the configuration to the field device in accordance with the device description;
determining whether the download of the value or attribute of the dominant parameter is successful;
downloading a value or attribute of a dependent parameter in the configuration when the download of the value or attribute of the dominant parameter is successful; and
validating the value or attribute of the dependent parameter in the configuration using an actual value or attribute of the dominant parameter from the field device when the download of the value or attribute of the dominant parameter is not successful.

21. The method of claim 18, wherein validating at least some of the multiple values or attributes in the configuration comprises:
identifying a value or attribute of an independent parameter in the configuration, the value or attribute of the independent parameter not depending on a value or attribute of any other parameter associated with the field device; and
downloading the value or attribute of the independent parameter in accordance with the device description.

* * * * *